(12) United States Patent
Myong et al.

(10) Patent No.: US 7,212,741 B2
(45) Date of Patent: May 1, 2007

(54) METHOD OF OPTIMIZING OUTPUT SIGNAL OF OPTICAL RECEIVER USING FEC AND OPTICAL RECEIVING SYSTEM USING THE METHOD

(75) Inventors: Seung Il Myong, Daejeon (KR); Jyung Chan Lee, Daejeon (KR); Je Soo Ko, Daejeon (KR)

(73) Assignee: Electronics and Telecommunications Research Institute (KR)

(*) Notice: Subject to any disclaimer, the term of this patent is extended or adjusted under 35 U.S.C. 154(b) by 715 days.

(21) Appl. No.: 10/436,909

(22) Filed: May 13, 2003

(65) Prior Publication Data
US 2004/0105687 A1    Jun. 3, 2004

(30) Foreign Application Priority Data
Nov. 7, 2002    (KR) ............... 10-2002-0068913

(51) Int. Cl.
*H04B 10/08* (2006.01)
*H04B 10/06* (2006.01)

(52) U.S. Cl. ..................... 398/27; 398/25; 398/17; 398/202

(58) Field of Classification Search ............ 398/27, 398/277, 24–26, 38, 15, 200, 206, 17, 33, 398/202, 183, 192, 194, 208; 375/229
See application file for complete search history.

(56) References Cited

U.S. PATENT DOCUMENTS

| | | | |
|---|---|---|---|
| 5,146,079 A | 9/1992 | Lisco | |
| 5,917,639 A | 6/1999 | Ushirozawa | |
| 6,081,362 A | 6/2000 | Hatakeyama et al. | |
| 6,151,150 A | 11/2000 | Kikuchi | |
| 6,154,256 A * | 11/2000 | Bruins | 348/533 |
| 6,178,213 B1 | 1/2001 | McCormack et al. | |
| 6,242,732 B1 | 6/2001 | Rantakari | |
| 6,243,183 B1 | 6/2001 | Enfors et al. | |
| 6,262,411 B1 | 7/2001 | Chandrasekhar | |
| 6,275,959 B1 | 8/2001 | Ransijn | |
| 6,513,136 B1 * | 1/2003 | Barker | 714/704 |

(Continued)

OTHER PUBLICATIONS

M. Kawai et al., "Smart Optical Receiver With Automatic Decision Threshold Setting and Retiming Phase Alignment", Journal of Lightwave Technology, vol. 7, No. 11, Nov. 1989.

(Continued)

*Primary Examiner*—Dalzid Singh
(74) *Attorney, Agent, or Firm*—Blakely Sokoloff Taylor & Zafman

(57) ABSTRACT

Optical signals transmitted through an optical cable are converted into digital data of bits "1" and "0" on the basis of a reference voltage, and errors generated during transmission of the optical signals are corrected using Forward Error Correction (FEC). A method includes extracting numbers of occurrence of errors for bits "1" and "0" recovered through the FEC. Thereafter, the extracted numbers of occurrence of errors for bits "1" and "0" are compared with each other. A reference voltage used to judge levels of the signals to be level "1" or "0" is controlled if the numbers of occurrence of errors for bits "1" and "0" are not equal to each other. The current reference voltage is maintained if the numbers of occurrence of errors for bits "1" and "0" are rendered equal to each other.

6 Claims, 5 Drawing Sheets

U.S. PATENT DOCUMENTS

| | | | |
|---|---|---|---|
| 6,715,113 B1* | 3/2004 | Bendak et al. | 714/708 |
| 6,889,347 B1* | 5/2005 | Adams et al. | 714/704 |
| 2003/0164724 A1* | 9/2003 | Momtaz et al. | 327/165 |

OTHER PUBLICATIONS

Neal S. Bergano et al., "Margin Measurements in Optical Amplifier Systems", IEEE Phototonics Technology Letters, vol. 5, No. 3, Mar. 1993.

Chang-Hee and Moon Soo Park, "Effects of Decision Ambiguity Level on Optical Receiver Sensitivity", IEEE Phototonics Technology Letters, vol. 7, No. 10, Oct. 1995.

M. Sherif, P.A. Davies, "Decision-Point Steering in Optical Fibre Communication Systems: Theory", IEE Proceedings, vol. 136, Pt. J. No. 3, Jun. 1989.

* cited by examiner

METHOD OF OPTIMIZING OUTPUT SIGNAL OF OPTICAL RECEIVER USING FEC AND OPTICAL RECEIVING SYSTEM USING THE METHOD

BACKGROUND OF THE INVENTION

1. Field of the Invention

The present invention relates generally to a method of optimizing an output signal of an optical receiver using FEC and an optical receiving system using the method, and more particularly to a method of optimizing the output signal of an optical receiver using FEC and an optical receiving system using the method that can maintain an optimized output signal of the optical receiver at an optimum level using the FEC in an optical communication system.

2. Description of the Prior Art

In general, an optical communication system that converts data into optical signals and transmits the optical signals through an optical cable at high speed employs a Forward Error Correction (FEC) method so as to correct errors generated during transmission of the optical signals.

The FEC method is an error correction method that is used in applications necessarily requiring real-time transmission. The FEC method transmits redundancy data together with data in order to recover original data, and recovers the original data using the redundancy data when received data are damaged.

FIG. 1 is a block diagram showing a schematic construction of an optical communication system using FEC. The optical communication system includes an FEC encoder 2, a data modulator 3, an optical transmitter 4, an optical cable 5, an optical receiver 6, a clock and data recovery unit 7, and an FEC decoder 8. The FEC encoder 2 encodes optical transmission data 1 in one of various formats such as SONET (Synchronous Optical NETwork), Synchronous Digital Hierarchy (SDH), Internet Protocol (IP), gigabit Ethernet, and Asymmetric Transfer Mode (ATM) formats. The data modulator 3 modulates data output from the FEC encoder 2 to be transmitted. The optical transmitter 4 converts transmission data output from the data modulator 3 into optical signals and transmits the optical signals. The optical cable 5 provides a path through which the optical signals transmitted from the optical transmitter 4 are passed. The optical receiver 6 converts the optical signals transmitted through the optical cable 5 into electric signals. The clock and data recovery unit 7 recovers a clock and data from the electric signals output from the optical receiver 6. The FEC decoder 8 corrects transmission errors of the data recovered by the clock and data recovery unit 7.

Referring to FIG. 1, an error measurement equipment 9 is a means for outputting a Bit Error Rate (BER) calculated in the FEC decoder 8.

In the optical communication system described above, data S4 transmitted in the form of an optical signal through the optical cable 5 are distorted due to optical loss, the nonlinear effects of an optical line like as optical dispersion of optical fiber, and optical noise factor generated from erbium-doped fiber amplifiers. The optical signal distorted during transmission is compensated for its distortion in various fashions. In general, an optical amplifier is employed to compensate for distortion caused by the optical loss, and an optical dispersion compensator is employed to compensate for distortion caused by the optical dispersion. However, there is no way to compensate for distortion caused by the nonlinear effect, so distortion of the optical signal caused by the nonlinear effect increases the BER.

FIG. 5a is a block diagram showing a general construction of an optical receiver 6 having a distortion compensation function. The optical receiver 6 includes an electro-optical converter 61, a post-amplifier 62 and a limiting amplifier 63. The electro-optical converter 61 converts transmitted optical signals into electric signals. The post-amplifier 62 amplifies the electric signals output from the electro-optical converter 61. The limiting amplifier 63 amplifies the electric signals output from the post-amplifier 62 to electric signals "1" or "0" and outputs the electric signals "1" or "0".

FIG. 5b is a view showing signal output characteristics 151 to 153 and probabilities of occurrence of errors 160 to 162 with respect to variations of a reference voltage S12. When the reference voltage S12 is at an optimum level, the output signal of the limiting amplifier 63 exhibits a symmetric characteristic as indicated by reference numeral 152, and has a minimum distribution of probabilities of occurrence of errors as indicated by reference numeral 161 with probabilities of occurrence of errors for bits "1" and "0" being equal to each other.

In contrast, when the reference voltage S12 is at an excessively low or high level, the output signal of the limiting amplifier 63 exhibits an asymmetric characteristic as indicated by reference numerals 151 and 153, and has a broad distribution of probabilities of occurrence of errors as indicated by reference numerals 160 and 162 with one of probabilities of occurrence of errors for bits "1" and "0" being greater than the other.

As a result, in order to reduce a probability of occurrence of a bit error, the reference voltage is required to have an optimum level.

In the optical communication system, optical signals transmitted through optical amplifiers and optical cables undergo phenomena in which the optical signals are compressed or spread due to the dispersion and nonlinear effects of an optical cable and noise is added to "1" level signals of the optical signals due to the naturally emitted noise of an optical amplifier. Therefore, in order to obtain optimal data characteristics by judging levels of signals to be levels "1" or "0" in the clock and data recovery unit 7, that is, a minimum BER, it is necessary to control the distributions of probabilities of errors for levels "1" and "0" of electric signals output from the optical receiver 6.

However, since in the prior art, a reference to judge levels of signals to be levels "1" or "0" is fixed, variations in the intensity of received optical signals or in judging level according to the eye-diagram of transmitted optical signals cannot be taken into account.

U.S. Pat. No. 5,146,079 entitled "Broadband optical receiver with active bias feedback circuit" discloses an optical receiver that is capable of minimizing distortion and a Signal-to-Noise ratio (SN). The patented optical receiver is provided at its reception stage with an attenuator and controls an attenuation ratio on the basis of the feedback of the levels of received signals, so the optical receiver can monitor and warn of the loss of signals using a signal loss monitor while maintaining the output levels of analog received signals to be constant. The patented optical receiver achieves output of a certain level at an analog signal stage and monitors only the loss of signals. Accordingly, the patented optical receiver does not disclose a solution to the distortion of signals.

SUMMARY OF THE INVENTION

Accordingly, the present invention has been made to solve the problems occurring in the prior art, and an object of the present invention is to provide a method of optimizing the output signal of an optical receiver using FEC and an optical receiving system using the method, which can maintain a reference voltage of the optical receiver at an optimum level using the FEC in an optical communication system.

In order to accomplish the above object, the present invention provides a method of optimizing the output signal of an optical receiver using FEC, in which optical signals transmitted through an optical cable are converted into digital data of bits "1" and "0" on the basis of a reference voltage, and errors generated during transmission of the optical signals are corrected using the FEC, comprising (a) extracting numbers of occurrence of errors for bits "1" and "0" recovered through the FEC; (b) comparing the extracted numbers of occurrence of errors for bits "1" and "0"; (c) controlling a reference voltage used to judge levels of the signals to be level "1" or "0" during the conversion of the optical signals into digital data if the comparison proves that the numbers of occurrence of errors for bits "1" and "0" are not equal to each other the comparison proves that; and (d) maintaining a current reference voltage if the numbers of occurrence of errors for bits "1" and "0" are equal to each other.

As a result, the present invention can optimally control a reference voltage used to judge levels of the signals to be level "1" or "0" with consideration being taken into variations in the intensity of received optical signals.

Preferably, in the method of the present invention, the step (c) is performed in such a way as to selectively decrease the reference voltage if the number of occurrence of errors for bit "1" are greater than the number of occurrence of errors for bit "0" and increase the reference voltage if the number of occurrence of errors for bit "1" are smaller than the number of occurrence of errors for bit "0".

Preferably, the method of the present invention further comprises the step of (e) determining whether the optical signals are lost, and stop performing of the step (d) if the optical signals are lost.

In addition, the present invention provides an optical receiving system, comprising an optical receiver for converting optical signals transmitted through an optical cable into electric signals, judging the levels of the electric signals to be "1" bit level or "0" bit level on the basis of a reference voltage; a clock and data recovery unit for recovering original data from the digital signals output from the optical receiver; an FEC decoder for detecting errors in the original data recovered by the clock and data recovery unit and correcting the errors; an error extractor for detecting numbers of error corrections for bits "1" and "0" in the FEC decoder; an error comparator for comparing the numbers of error corrections with each other and outputting a reference voltage control signal; and a reference voltage generator for generating a reference voltage of a level controlled in response to the reference voltage control signal and feeds the reference voltage of the controlled level to the optical receiver.

Preferably, in the optical receiving system of the present invention, the error comparator outputs a control signal to reduce the level of the reference voltage if the number of error corrections for bit "1" is larger than the number of error corrections for bit "0", and a control signal to increase the level of the reference voltage if the number of error corrections for bit "1" is smaller than the number of error corrections for bit "0".

Preferably, in the optical receiving system of the present invention, the error comparator receives a Loss-Of-Signal (LOS) signal indicating a loss of the signal from the clock and data recovery unit, and stops comparing the numbers and outputting the control signal if the optical signal is lost.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
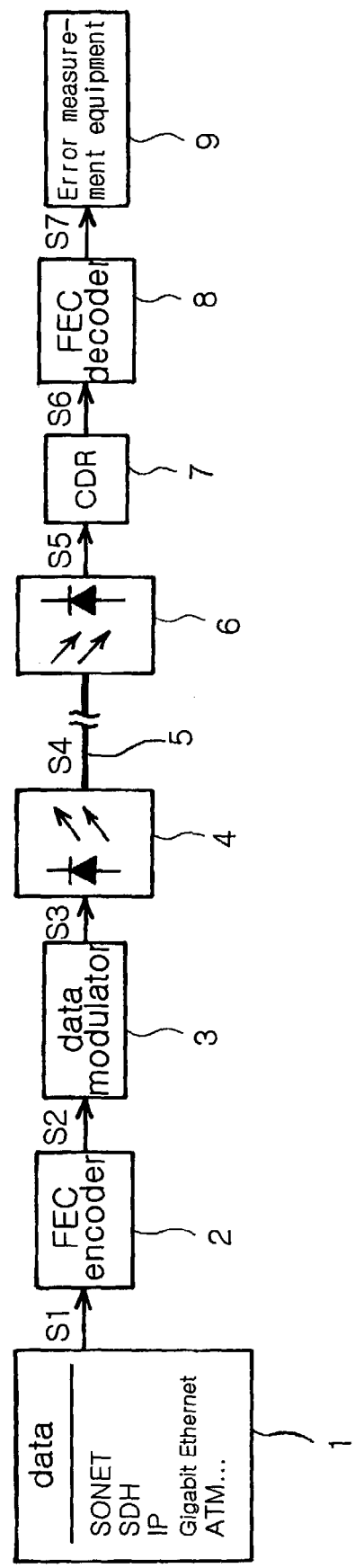
FIG. 1 is a block diagram showing a schematic construction of an optical communication system using FEC.

Reference now should be made to the drawings, in which the same reference numerals are used throughout the different drawings to designate the same or similar components.

With reference to the accompanying drawings, a method of optimizing the output signal of an optical receiver using FEC and an optical receiving system using the method is described below.

Figure 2:
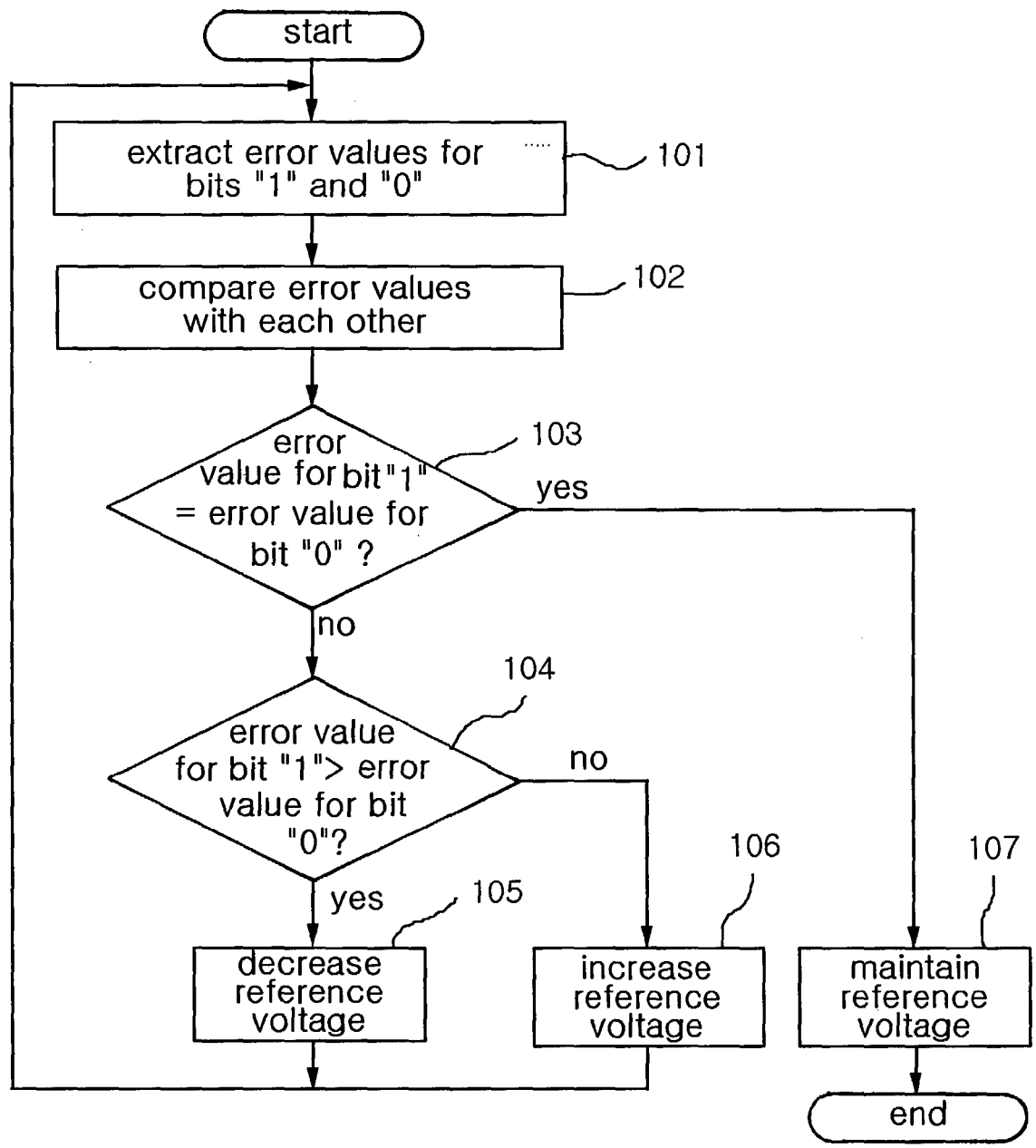
FIG. 2 is a flowchart showing a method of optimizing an output signal of an optical receiver using FEC.

FIG. 2 is a flowchart showing a method of optimizing an output signal of an optical receiver using FEC. In accordance with the output signal optimizing method of the present invention, in the optical communication system illustrated in FIG. 1, the optical receiver 6 receives optical signals transmitted through the optical cable 5 and coverts the optical signals into electric signals of levels "1" or "0", the clock and data recovery unit 7 recovers a clock and data from the electric signals of levels "1" or "0" output from the optical receiver 6, and the FEC decoder 8 controls a reference voltage to judge levels of the electric signals to be a level "1" or "0" so that probabilities of occurrence of errors for bits "1" and "0" are rendered equal to each other in the process of correcting errors occurring in the recovered data output by the clock and data recovery unit 7. The detailed process of the method will be described hereinafter.

First, in the process of receiving optical signals and converting these optical signals into data, information on the errors of the data is extracted from the FEC decoder 8 at step 101.

As described above, at an optical reception stage, the FEC decoder 8 corrects errors generated in the data received thereby. The FEC decoder 8 stores error information for bits "1" and "0" that is obtained during the error correction. The numbers of error corrections (error values) for bits "1" and "0" are calculated by extracting the error information for bits "1" and "0" from the FEC decoder 8.

Thereafter, extracted error values are compared with each other at step 102.

In this case, when no error information is extracted because no error occurs, the process ends without any control of the reference voltage.

In contrast, when an error occurs, the error is corrected in the FEC decoder 8 and error information is extracted, error values for bits "1" and "0" are compared with each other to determine whether the two error values are equal to each other at step S103. If the two error values are not equal to each other, it is determined whether the error value for bit "1" is greater than the error value for bit "0" at step S104.

If as the result of the comparisons, the two error values are not equal to each other but the error value for bit "1" is greater than the error value for bit "0", the reference voltage used to judge the levels of signals to be level "1" or "0" in the optical receiver 6 is decreased by a preset unit level at step 105.

In contrast, if as the result of the comparisons, the two error values are not equal to each other but the error value for bit "1" is smaller than the error value for bit "0", the reference voltage used to judge the levels of signals to be level "1" or "0" in the optical receiver 6 is increased by a preset unit level at step 106.

After the reference voltage is controlled as described above, error information is repeatedly extracted from the FEC decoder 8, and the steps 101 and 102 are repeated.

If the error values for bits "1" and "0" are not equal to each other as the result of comparing the error values for bits "1" and "0" with each other, the steps 103 to 106 of controlling the reference voltage are repeated. Finally, if the error values for bits "1" and "0" are rendered equal to each other, the current reference voltage is maintained as it is at step 107, and the process ends.

By the above-described process, the distribution of levels "1" and "2" of the signals S5 transmitted to the clock and data recovery unit 7 are made uniform while the optical signals are received and processed. Accordingly, the probabilities of occurrence of errors for levels "1" and "0" are rendered equal to each other, so a minimum BER can be achieved.

Figure 3:
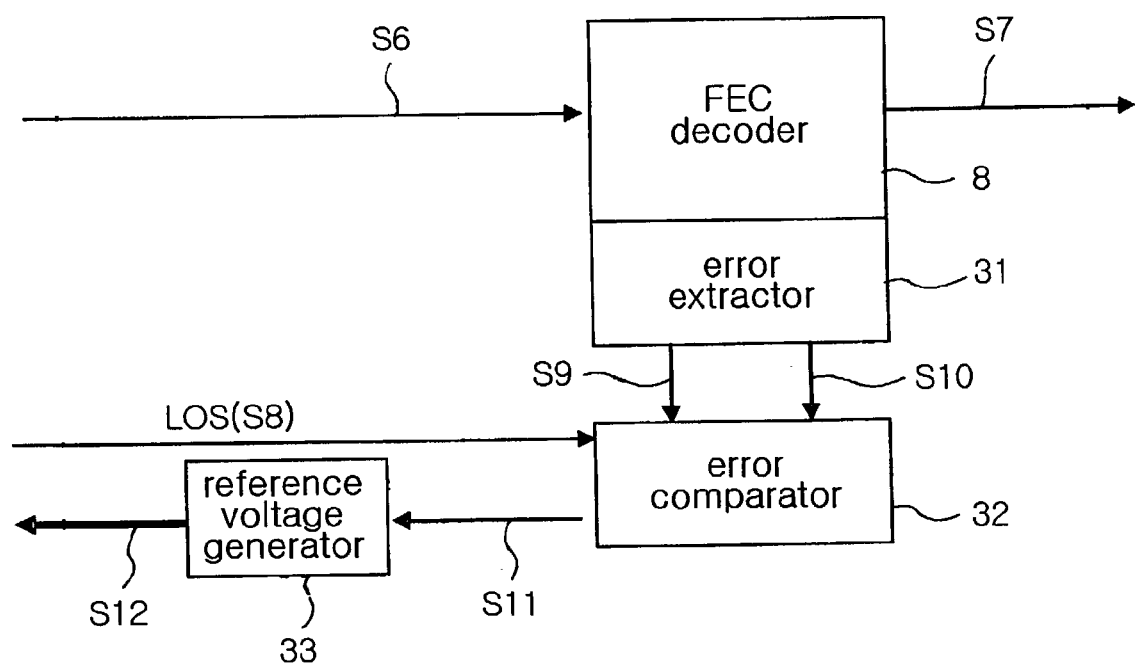
FIG. 3 is a block diagram showing an apparatus for optimizing the output signal of the optical receiver using FEC.

FIG. 3 is a block diagram showing an apparatus for optimizing the output signal of the optical receiver using FEC. This apparatus includes an error extractor 31, an error comparator 32 and a reference voltage generator 33. The error extractor 31 receives error correction information from the FEC decoder 8, and extracts error occurrence information for bits "1" and "0" from the error correction information. The error comparator 32 receives values of occurrence of errors S9 and S10 for bits "1" and "0" from the error extractor 31 and a Loss-Of-Signal (LOS) signal S8 indicating the loss of a signal from the clock and data recovery unit 7, compares the values of occurrence of errors S9 and S10 for bits "1" and "0" with each other, and outputs a reference voltage maintaining signal if the values of occurrence of errors S9 and S10 are equal to each other or an optical signal is lost, and a reference voltage adjusting signal if the values of occurrence of errors S9 and S10 are not equal to each other. The reference voltage generator 33 generates a reference voltage S12 having a certain level, applies the reference voltage S12 to the limiting amplifier 63 of the optical receiver 6, and adjusts the level of the generated reference voltage S12 in response to an adjustment signal output by the error comparator 32.

Figure 4:
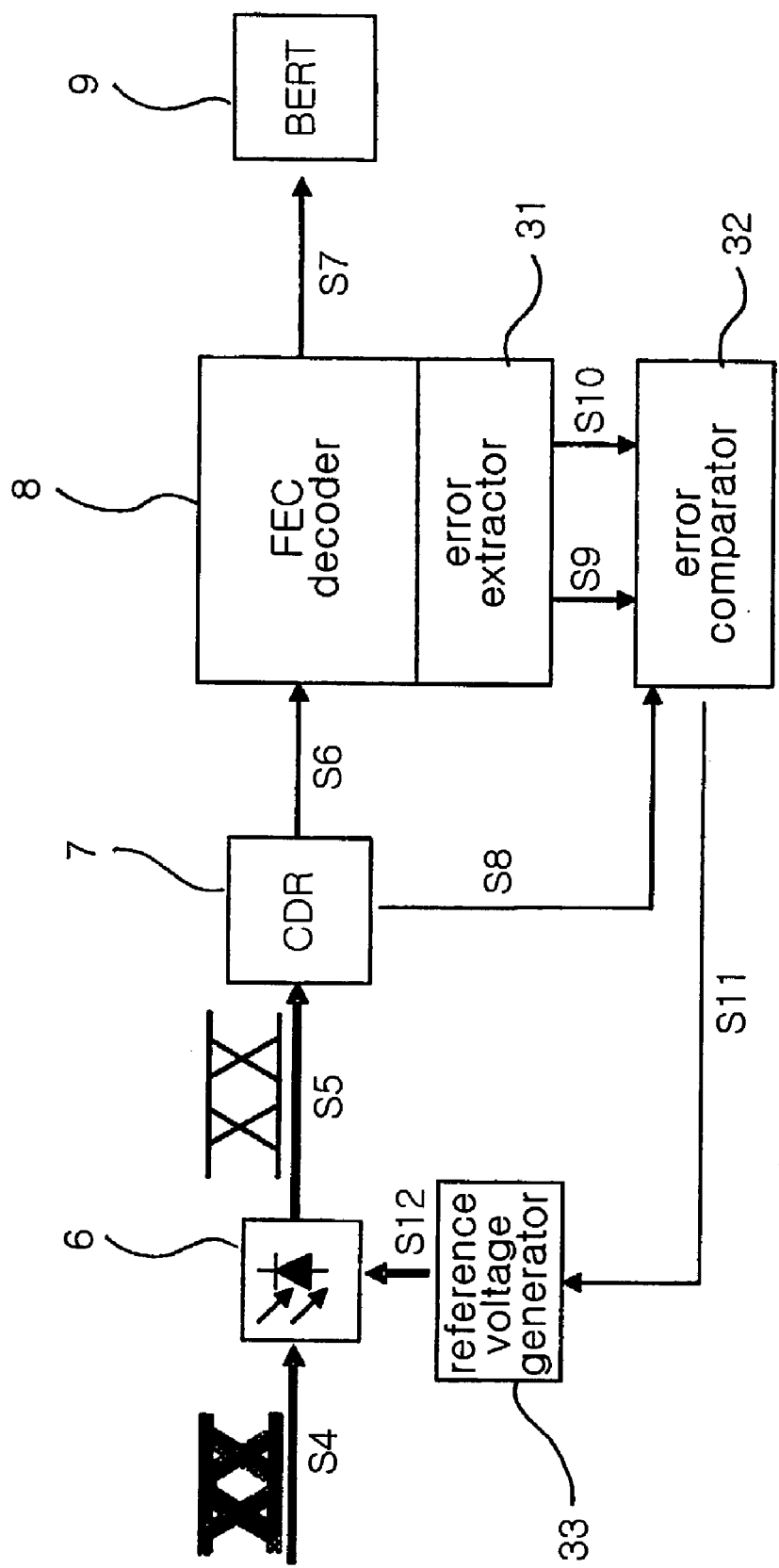
FIG. 4 is a block diagram showing an entire construction of an optical receiving system to which the output signal optimizing apparatus is applied.
Figure 5B:
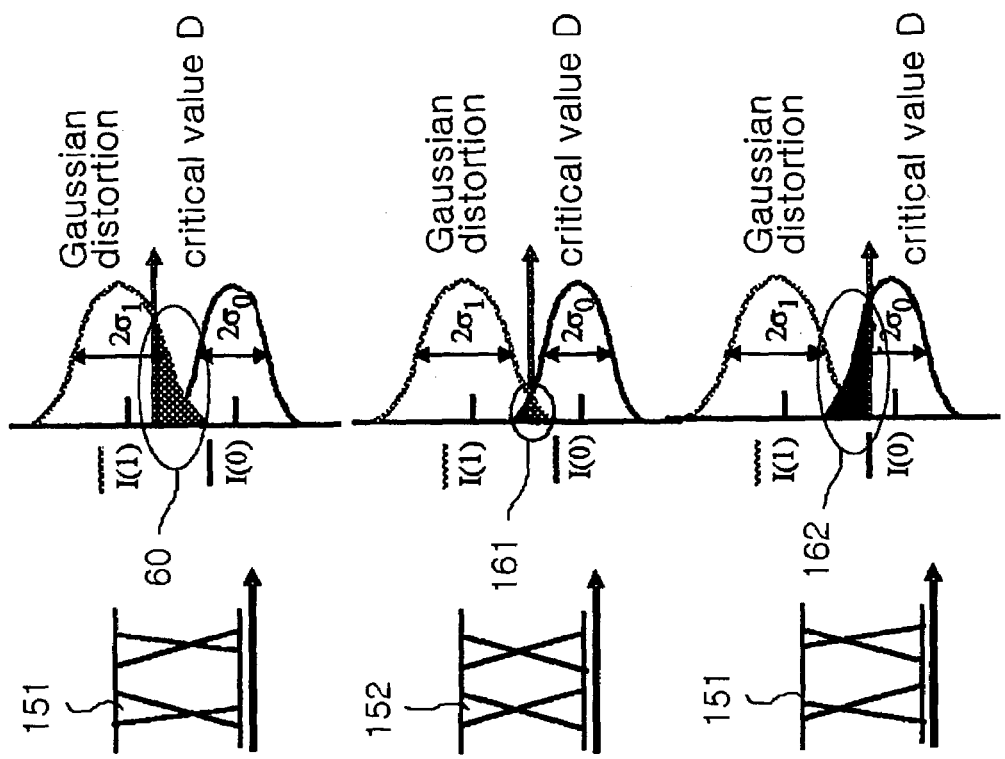
FIG. 5b is a view showing signal output characteristics and probabilities of occurrence of errors with respect to variations of a reference voltage.
Figure 5A:
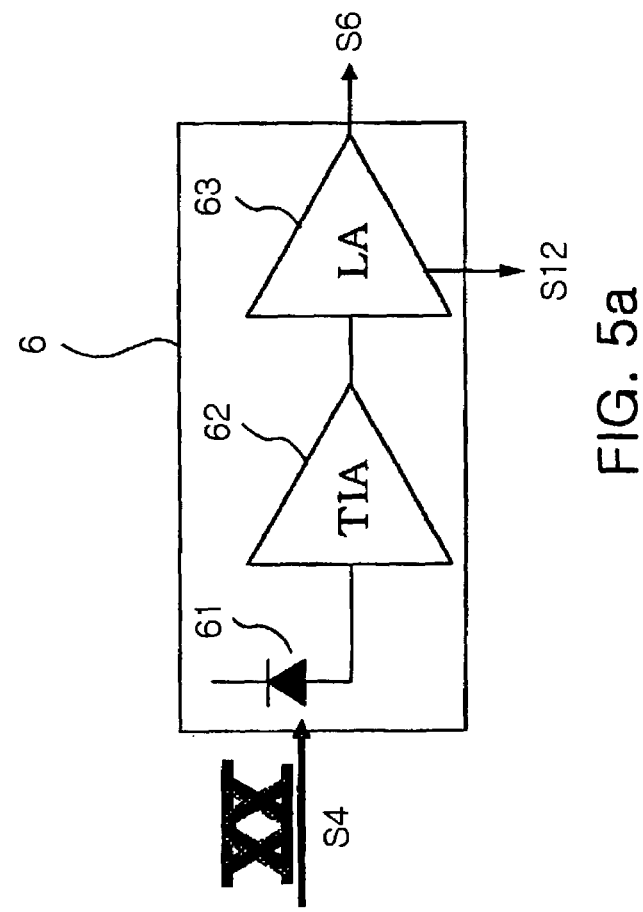
FIG. 5a is a block diagram showing a general construction of an optical receiver having a distortion compensation function.

FIG. 4 is a block diagram showing an entire construction of an optical receiving system to which the output signal optimizing apparatus is applied.

With reference to FIG. 4, an operation of the optical receiving system as set forth in the present invention is described below.

Signals S5, restored to electric signals of levels "0" and "1", are restored to data of "1" and "0" bits through the clock and data recovery unit 7. These recovered data S6 have their errors, which are generated during transmission, corrected while passing through the FEC decoder 8. The corrected data S7 are then transmitted to another network.

Meanwhile, the error extractor 31 extracts the numbers of error corrections S9 and S10 for bits "1" and "0" found during error correction in the FEC decoder 8, and applies them to the error comparator 32.

Thereafter, the error comparator 32 compares the numbers of error corrections S9 and S10 for bits "1" and "0" with each other and generates a signal S11 to control a reference voltage of the limiting amplifier 63 of the optical receiver 6.

The reference voltage generator 33 having received the voltage control signal S11 from the error comparator 32 generates a reference voltage S12 of a level corresponding to the voltage control signal S11, and applies it to the optical receiver 6.

In this case, the error comparator 32 compares the numbers of error corrections S9 and S10 for bits "1" and "0" with each other, and outputs a control signal to reduce the level of the reference voltage S12 if the number of error corrections S9 for bit "1" is larger than the number of error corrections S10 for bit "0", a control signal to increase the level of the reference voltage S12 if the number of error corrections S9 for bit "1" is smaller than the number of error corrections S10 for bit "0", and a control signal to maintain the current level of the reference voltage S12 if the number of error corrections S9 for bit "1" is equal to the number of error corrections S10 for bit "0".

Accordingly, the reference voltage S12 which is at a level lower than the level of the current reference voltage S12 by a preset unit level is generated in the case where the number of error corrections S9 for bit "1" is larger than the number of error corrections S10 for bit "0", the reference voltage S12 of a level higher than the level of the current reference voltage S12 by a preset unit level is generated in the case where the number of error corrections S9 for bit "1" is smaller than the number of error corrections S10 for bit "0", and the reference voltage S12 of a level equal to the level of the current reference voltage S12 is generated in the case where the number of error corrections S9 for bit "1" is equal to the number of error corrections S10 for bit "0".

In the meantime, when no optical signals are received from the clock and data recovery unit 7, the error comparator 32 receives an LOS signal S8 indicating that an optical signal is lost. If the optical signal is lost, error corrections are not performed in the FEC decoder 8, so the error comparator 32 cannot compare bit errors with each other. Therefore, when the LOS signal S8 is applied to the error comparator 32, the error comparator 32 deactivates its comparison function. Accordingly, the level of the reference voltage S12 output from the reference voltage generator 33 is maintained as it is.

As a result, in the above-described optical receiving system, the numbers of error corrections for bits "1" and "0" are rendered equal to each other, so probabilities of occurrence of errors for bits "1" and "0" are made equal, thus maintaining the BER at a minimum.

As described above, the present invention provides a method of optimizing an output signal of an optical receiver using FEC and an optical receiving system using the method, in which optical signals transmitted through an optical cable are converted into electric signals, that is, digital data of bits "1" and "0", and a reference voltage is optimally controlled in the process of correcting errors generated during transmission of the optical signals using the FEC. Accordingly, probabilities of occurrence of errors for bits "1" and "0" can be minimized, so the efficiency and performance of transmitted optical signals can be maximized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of optimizing output signal of an optical receiver using Forward Error Correction (FEC), in which optical signals transmitted through an optical cable are converted into digital data of bits "1" and "0" on the basis of a reference voltage, and errors generated during transmission of the optical signals are corrected using the FEC, the method comprising:
    (a) extracting numbers of occurrence of errors for bits "1" and "0" recovered through the FEC;
    (b) comparing the extracted numbers of occurrence of errors for bits "1" and "0";
    (c) controlling a reference voltage used to judge levels of the signals to be level "1" or "0" during the conversion of the optical signals into digital data if the numbers of occurrence of errors for bits "1" and "0" are not equal to each other as the result of the comparison;
    (d) maintaining the reference voltage if the numbers of occurrence of errors for bits "1" and "0" are rendered equal to each other as the result of the comparison; and
    (e) deactivating the comparing step (b) if the optical signals are lost.

2. The method as set forth in claim 1, wherein the step (c) is performed in such a way as to selectively decrease the reference voltage if the number of occurrence of errors for bit "1" are greater than the number of occurrence of errors for bit "0" and increase the reference voltage if the number of occurrence of errors for bit "1" are smaller than the number of occurrence of errors for bit "0".

3. The method as set forth in claim 1, further comprising the step of:

(e) determining whether the optical signals are lost, and stop performing of the step (d) if the optical signals are lost.

4. An optical receiving system, comprising:
    an optical receiver for converting optical signals transmitted through an optical cable into electric signals, judging the levels of the electric signals to be "1" bit level or "0" bit level on the basis of a reference voltage;
    a clock and data recovery unit for recovering original data from the digital signals output from the optical receiver;
    an FEC decoder for detecting errors in the original data recovered by the clock and data recovery unit and correcting the errors;
    an error extractor for detecting numbers of error corrections for bits "1" and "0" in the FEC decoder;
    an error comparator for comparing the numbers of error corrections with each other and outputting a reference voltage control signal;
    a reference voltage generator for generating a reference voltage of a level controlled in response to the reference voltage control signal and feeds the reference voltage of the controlled level to the optical receiver;
    wherein the clock and data recovery unit generates a Loss-Of-Signal (LOS) signal to deactivate the error comparator if the optical signals are lost.

5. The optical receiving system as set forth in claim 4, wherein the error comparator outputs a first control signal to reduce the level of the reference voltage if the number of error corrections for bit "1" is larger than the number of error corrections for bit "0" and a second control signal to increase the level of the reference voltage if the number of error corrections for bit "1" is smaller than the number of error corrections for bit "0"

6. The optical receiving system as set forth in claim 4, wherein the error comparator receives the Loss-Of-Signal (LOS) signal indicating a loss of the optical signals from the clock and data recovery unit, and stops comparing the numbers and outputting the reference voltage control signal if the optical signals are lost.

* * * * *